J. E. STAGL.
BELT SHIFTER.
APPLICATION FILED MAR. 8, 1920.
1,362,967.
Patented Dec. 21, 1920.
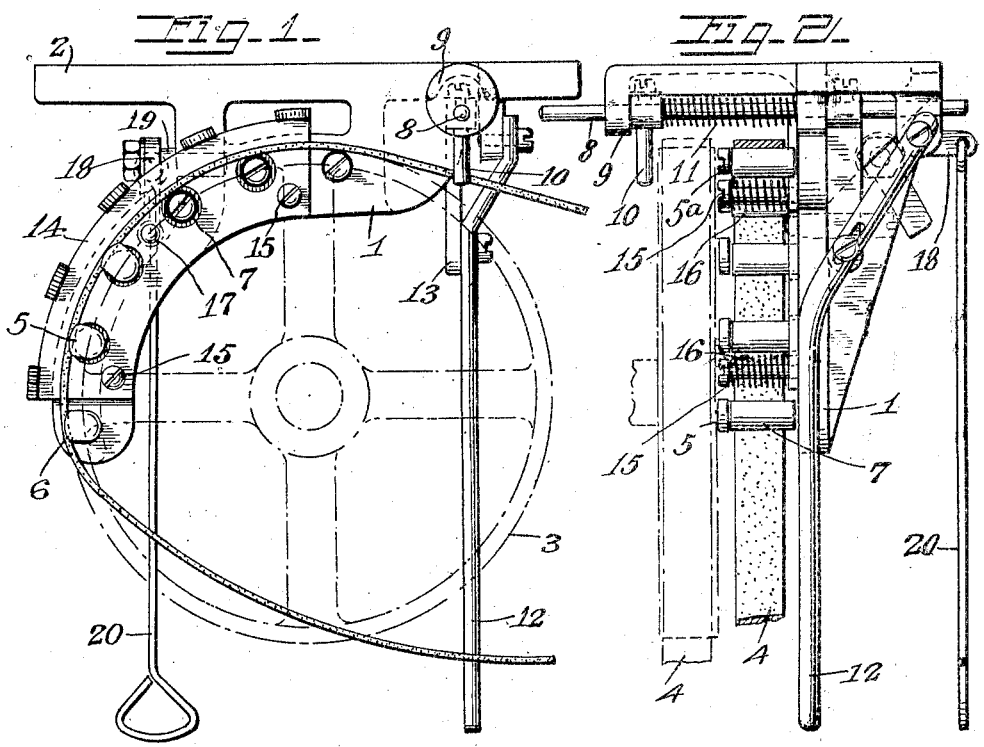
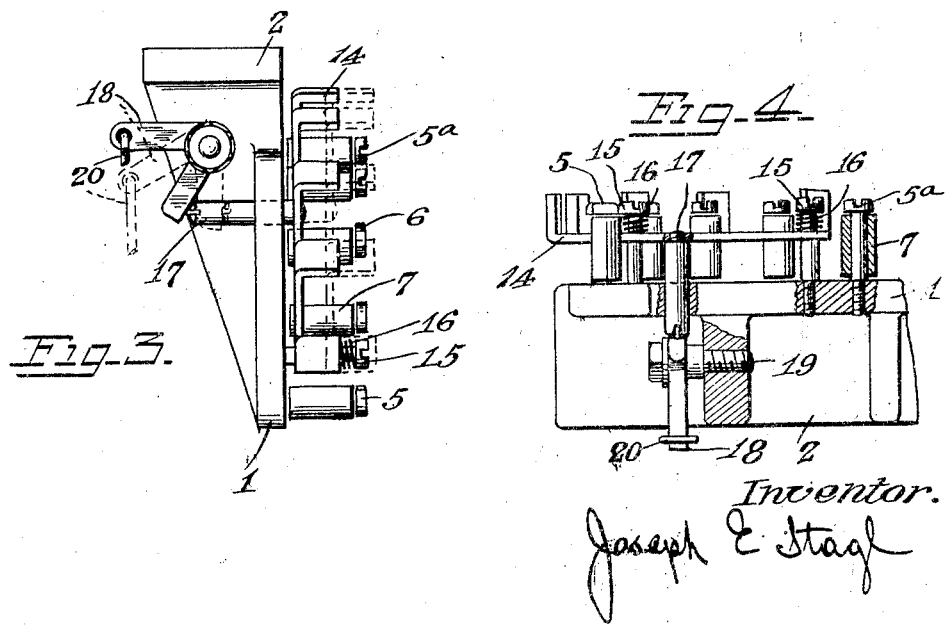
Inventor.
Joseph E. Stagl

UNITED STATES PATENT OFFICE.

JOSEPH E. STAGL, OF BROOKLYN, NEW YORK.

BELT-SHIFTER.

1,362,967.　　　Specification of Letters Patent.　　Patented Dec. 21, 1920.

Application filed March 8, 1920.　Serial No. 364,227.

*To all whom it may concern:*

Be it known that I, JOSEPH E. STAGL, a citizen of the United States, residing at 724 Quincy St., Brooklyn, in the county of Kings and State of New York, have invented a new and useful Belt-Shifter, of which the following is a specification.

The invention relates to the improvements in safety devices for shifting belts from power shaft pulleys to a fixed support or rest and back to the power pulley, and has for its object to safeguard the operator of a machine from accidents and the elimination of the idler pulley commonly used for this purpose and to afford means by which such shifting may be readily and easily accomplished.

These objects are attained by the mechanism illustrated in the accompanying drawings in which—

Figure 1 is a side view of the invention

Fig. 2 is a front elevation partly in section

Fig. 3 is a detail view of the means for shifting the belt from the belt rest to the pulley, and Fig. 4 is a plan view of the detail shown in Fig. 3.

The belt rest comprises a segment bracket 1 and 2 attached to the ceiling and is mounted adjacent the driving pulley 3 and concentrically with the pulley shaft, the outer edge of the segment having a radius slightly longer than the radius of the pulley. The segment is substantially coextensive with that part of the pulley in contact with the belt 4.

5 designates a series of pins screwed into the face of the segment at intervals along and inwardly from its outer edge and projecting toward and close to the edge of the pulley 3 and each pin 5 with three exceptions has on its free end a radial flange or bent up portion 6 projecting outwardly from the axial center of the segment. On the pins 5ª nearest the upper end of the segment bracket 1 the bent up portion is omitted. On each of the pins 5 and 5ª rollers 7 are mounted which are held in place by the bent up portions 6 which project somewhat beyond the surface of the rollers. The roller on the pins 5ª are held in place by a head on the pins which heads are slightly smaller in diameter than the roller. This series of pins 5 and 5ª thus forms a support or rest for the belt when shifted from the pulley, the rollers 7 facilitating the movement of the belt to and from the rest or support.

For shifting the belt from the pulley to the belt rest or pins 5 and 5ª a rod is mounted for reciprocation in brackets 9, said rod 8 extending across the face of the pulley and belt rest and having rigidly attached a depending pin 10 for contacting with the edge of the belt and pushing it from the pulley to the pins 5 and 5ª. A coil spring 11 mounted on the rod 8 inside of the bracket 9 and the pin 10 tends to hold the rod 8 in inactive position. The rod 8 can be reciprocated by a handle 12 having its upper end attached to the segment bracket 1 and being connected at a point intermediate its ends to an arm 13 rigidly connected to the rod 8.

For shifting the belt from the rest or pins 5, 5ª an arcuate plate 14 is mounted on the upper portion of the segment bracket 1 and parallel therewith. The plate 14 is of the same width and curvature as the segment and of a length to include four or more of the roller bearing pins 5, which pins project loosely through enlarged holes in the plate.

Each end of the plate 14 has an enlarged hole to pass headed pins 15 which are rigidly attached to segment bracket 1 and has mounted thereon a coil spring 16 between the plate 14 and the head of the pin, these springs tending to hold the plate 14 against the segment bracket 1. The middle portion of the plate 14 has rigidly attached thereto a pin 17 which projects freely through a hole in the segment bracket 1 for the purpose of shifting the plate toward and from the segment bracket 1. It will thus be seen that the plate 14 resting normally against the segment bracket 1 with its outer edge coinciding with the outer edge of the segment and the pins 5 being located, as stated, inwardly from this edge, the plate 14 may engage the edge of the belt when the latter is resting on the pins 5 5ª and push the belt from the pins or rest.

For operating this shifting plate 14, a bell crank lever 18 is mounted on a stud 19 rigidly attached to the segment bracket 1 on the side opposite the pins 5, 5ª and between the headed pins 15 in such position that one end of the bell crank lever projecting downwardly will engage the end of the pin 17. The outwardly projecting end of the bell crank lever 18 has attached a pull rod 20 for operating the plate 14.

The operation of the invention is as follows: When it is desired to shift the belt from the pulley to the belt rest or pins 5, 5$^a$, the handle 12 is manipulated and the belt is pushed from the pulley to the rest by contact of the pin 10 with the edge of the belt, the absence of a bent up portion 6 on the pin 5$^a$ making such shifting easier, and the rollers 7 permitting running movement of the belt without undue friction. When it is desired to shift the belt from the pins 5, 5$^a$ to the pulley the operator will pull down on the pull rod 20, which by the engagement of the bell crank lever 18 with the pin 17 will push the plate 14 toward the ends of the pins 5 and the pulley and with it the belt which is thus transferred to the pulley. The springs 16 will return the plate 14 to normal position upon release of the rod 20.

I claim—

1. In a safety belt shifting device the combination of a segment bracket or support, a circular series of pins rigidly mounted on said support, rollers mounted on said pins and a shifting device mounted on said support, said shifting device comprising an arcuate plate parallel with said support and embracing certain of said roller bearing pins and means for shifting said plate toward and from said support.

2. In a safety belt shifting device a segment bracket or support, a series of pins rigidly carried by said support, at least two of or the equivalent pins having a bent up portion on their ends, rollers mounted on said pins and held thereon by said bent up portions and an arcuate plate mounted on said support and embracing certain of said roller bearing pins, and means for shifting said plate toward and from said support whereby the belt may be shifted from the support to a pulley.

Signed at Brooklyn, in the county of Kings and State of New York this 6th day of March, A. D. 1920.

JOSEPH E. STAGL.